United States Patent
Rothschild

(10) Patent No.: US 6,935,274 B1
(45) Date of Patent: Aug. 30, 2005

(54) PET TOY

(76) Inventor: Steven M. Rothschild, 40 Jackson St., Suite 1100, Worcester, MA (US) 01608-2210

( * ) Notice: Subject to any disclaimer, the term of this patent is extended or adjusted under 35 U.S.C. 154(b) by 0 days.

(21) Appl. No.: 10/606,156

(22) Filed: Jun. 25, 2003

Related U.S. Application Data

(60) Provisional application No. 60/391,328, filed on Jun. 25, 2002.

(51) Int. Cl.$^7$ .................. A01K 15/02; A01K 29/00; A63B 39/00; A63B 41/00; A63H 5/00
(52) U.S. Cl. .................. 119/702; 119/707; 119/709; 473/594; 473/595; 473/571; 446/397; 446/404; 446/180; 446/188; 446/197; 446/168
(58) Field of Search .................. 119/702, 707, 709–711; D30/160; D21/713; 473/594, 595, 571, 397, 473/404, 180, 188, 197

(56) References Cited

U.S. PATENT DOCUMENTS

| | | | |
|---|---|---|---|
| 1,595,441 A * | 8/1926 | Zenger | 473/571 |
| 1,668,143 A * | 5/1928 | Daasch | 473/571 |
| 2,687,302 A * | 8/1954 | Stiegler | 473/571 |
| 3,995,855 A * | 12/1976 | Schultz | 473/594 |
| 5,769,682 A * | 6/1998 | DiResta et al. | 446/184 |
| 6,112,703 A * | 9/2000 | Handelsman | 119/707 |
| 6,186,095 B1 * | 2/2001 | Simon | 119/707 |
| 6,609,944 B1 * | 8/2003 | Viola | 446/409 |
| 2002/0134318 A1 * | 9/2002 | Mann et al. | 119/709 |
| 2004/0092198 A1 * | 5/2004 | Ritchey | 446/71 |

FOREIGN PATENT DOCUMENTS

| | | | | |
|---|---|---|---|---|
| WO | WO 90/07961 | * | 7/1980 | A63F 9/00 |

* cited by examiner

Primary Examiner—Peter M. Poon
Assistant Examiner—Andrea M. Valenti
(74) Attorney, Agent, or Firm—Blodgett & Blodgett, P.C.

(57) ABSTRACT

The pet toy consists of an inner elastomer ball having an inner ball wall, a squeaker mounted in the inner ball wall, an outer elastomer ball having an outer ball wall, an air hole mounted in the outer ball wall, the inner ball being within the outer ball. The outer ball protects the squeaker from dislodgement from the wall of the inner ball and protects the inner ball wall when the pet attacks the toy. The inner ball can be pushed through air hole so that the inner ball can be placed into the outer ball.

2 Claims, 1 Drawing Sheet

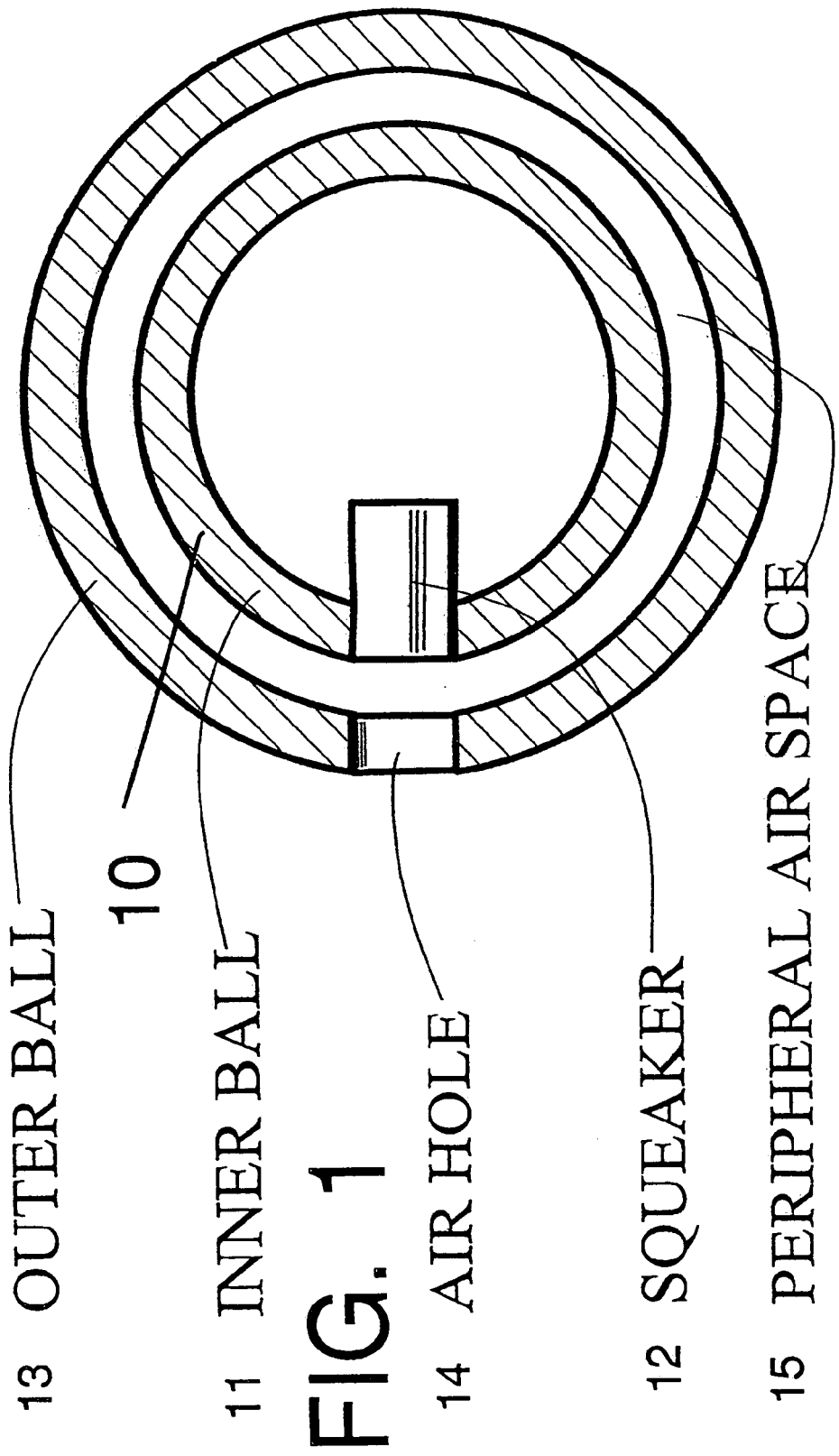

US 6,935,274 B1

PET TOY

CROSS-REFERENCE TO RELATED APPLICATIONS

This application claims the benefit under 35 U.S.C. §119(e) of U.S. Provisional Application No. 60/391,328 filed Jun. 25, 2002, and which is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention relates generally to pet toys which make a squeaking sound when a pet squeezes the toy.

BACKGROUND OF THE INVENTION

It is very common to provide squeezable pet toys of various shapes and sizes with a squeaker mounted in the wall of the toy. The squeaker makes a squeaking sound when a pet squeezes the toy as air passes through the squeaker. The problem is that the squeaker is usually made of relatively hard plastic, whereas the body of the squeezable pet toy itself is usually made of very flexible plastic. When the pet attacks the toy, the mounting of the squeaker in the wall is eventually overstressed and the squeaker is dislodged from the toy, rendering the toy silent.

Current squeaky toys break very quickly under normal play conditions. The squeaker is either part of the mold or attached to the single wall mold. In either case, when the outside wall gets punctured or the squeaker gets chewed, crushed, etc., the toy stops making noise. Once the squeaker is broken, the toy loses appeal. The second issue is, to get good sound, the wall of the squeaky toy has to be pliable. The issue with this is the toy can easily be punctured or torn again eliminating the appeal for the pet and causing the play area to require cleaning once the toy is shredded.

All of the above systems have drawbacks and limitations. The limitations relate to the lack of durability in that the squeaker is too accessible to the pet and too easily dislodged from the toy and the wall that causes the squeaking is too easily punctured.

These and other difficulties experienced with the prior art systems have been obviated in a novel manner by the present invention.

It is, therefore, an outstanding object of the present invention to provide a pet toy in which the squeaker is protected from dislodgement caused by attack by the pet.

It is another outstanding object of the present invention to provide a pet toy which is durable.

It is another outstanding object of the present invention to provide a pet toy which has a long term functioning squeaker.

It is another outstanding object of the present invention to provide a pet toy which has good squeaker sound.

It is a further object of the invention to provide a pet toy which is capable of being manufactured of high quality and at a low cost, and which is capable of providing a long and useful life with a minimum of maintenance.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

This invention is a squeaky toy for pets that is durable and can't be easily damaged. The invention is a pet toy consisting of an inner elastomer ball having an inner highly-flexible ball wall, a squeaker mounted in the inner ball wall, an outer elastomer ball having an outer highly-durable ball wall, an air hole mounted in the inner ball wall, the inner ball being within the outer ball. The outer ball wall protects the inner ball wall.

The inner ball can be pushed through air hole so that the inner ball can be placed into the outer ball. The outer ball protects the squeaker from being dislodged from the wall of the inner ball when the pet attacks the toy.

BRIEF DESCRIPTION OF THE DRAWINGS

The character of the invention, however, may best be understood by reference to one of its structural forms, as illustrated by the accompanying drawings, in which:

FIG. 1 is a sectional side elevation view of one embodiment of the present invention.

DETAILED DESCRIPTION OF THE INVENTION

Referring to FIG. 1, there is seen illustrated one embodiment of apparatus suitable for the practice of this invention. The pet toy 10 consists of a hollow inner elastomer ball 11 having an inner ball wall, a squeaker 12 mounted in the inner ball wall, a hollow outer elastomer ball 13 having an outer ball wall, an air hole 14 mounted in the outer ball wall, the inner ball 11 being within the outer ball 13. The inner diameter of the outer ball 13 is larger than the outer diameter of the inner ball 11 so that there is an air space 15 between the inner ball 11 and outer ball 13.

This invention is a durable squeaky toy for pets. The toy uses a double wall construction with an air gap, permitting the pet to participate in play with the toy and not cause squeaker failure. The squeaker is embedded or attached to the inside unit. Preferably the squeaker is glued into a hole in the wall of the inner ball. The outside wall may be sufficiently thick or textured so as to disguise the location of the interior squeaker inside and to protect the wall of the inner ball. The inside vehicle is small enough to move within the outer ball, varying the relative placement of the squeaker, the inner ball is protected by the outside wall so that the inner ball wall may be thin enough to easily expand and contract causing the squeaker to function effectively and without damage.

The invention can involve an inner and outer ball of any complementary shape, spherical, cubic, etc, the shape within a shape such as a ball within a ball. Squeaker is not embedded in the outside wall. Squeaker is embedded or attached to the inside wall of the part called the squeaker housing unit. Squeaker-housing unit or inner ball is protected by the outside wall of the toy. There is a sufficient air gap between the outside wall and the squeaker housing unit to provide enough volume for squeaker housing unit to exhaust and take back sufficient air so as to permit the squeaker to function. The outside wall has air intake/exhaust points to permit air in and out. The outside wall is of thickness and firmness so as to permit pressure to be applied on the squeaker-housing unit. Outside wall is thick enough and may be textured to reduce the pets ability to feel or damage the squeaker and to puncture the inner ball wall. Squeaker-housing unit is soft enough to compress due to pressure from the outside wall, as well as soft enough to return to its original shape unhampered by atmospheric pressure.

Interior ball carriers the squeaker. The interior ball is a soft latex sphere, like most production squeaky pet toys, with a squeaker embedded in the outside wall. The interior ball has a diameter of 2.5 inches.

The outside ball is a thicker walled latex or durable flexible plastic with a textured outer surface. There is a hole of 1" or less in the outer ball for the toy to be able to exhaust and take in air. The outside ball has a diameter of 4 inches.

To accomplish insertion of the inner ball into the outer ball, the inner or interior ball is compressed and squeezed into the outside ball through the one-inch hole in the outside or outer ball. Once inserted, the interior ball should automatically re-inflate.

The outer ball 13 protects the squeaker 12 from dislodgement from the wall of the inner ball 11 and protects the inner ball wall when the pet attacks the toy 10. The inner ball 11 can be pushed through air hole 14 so that the inner ball 11 can be placed into the outer ball 13.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

1. A pet toy consisting of:
    (a) an inner flexible elastomer ball having an inner ball wall,
    (b) a squeaker mounted in the inner ball wall,
    (c) an outer flexible elastomer ball having an outer ball wall, said squeaker being separate from the outer wall,
    (d) an air hole mounted in the outer ball wall, and
    (e) the inner ball being entirely within the outer ball and free-floating within the outer ball.
2. A pet toy as recited in claim 1, wherein the outer ball wall has an outer surface and the said outer surface is textured.

\* \* \* \* \*